(12) United States Patent
Nakamura et al.

(10) Patent No.: US 9,523,851 B2
(45) Date of Patent: Dec. 20, 2016

(54) LIGHT DEFLECTION UNIT, OPTICAL SCANNING APPARATUS, AND IMAGE FORMING APPARATUS

(71) Applicant: CANON KABUSHIKI KAISHA, Tokyo (JP)

(72) Inventors: Akira Nakamura, Tokyo (JP); Yoshihiko Tanaka, Mishima (JP); Hiroyuki Fukuhara, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/927,156

(22) Filed: Oct. 29, 2015

(65) Prior Publication Data
US 2016/0131896 A1  May 12, 2016

(30) Foreign Application Priority Data
Nov. 12, 2014 (JP) .................. 2014-229797

(51) Int. Cl.
G03G 15/00 (2006.01)
G02B 26/12 (2006.01)
G03G 15/04 (2006.01)

(52) U.S. Cl.
CPC ........... *G02B 26/121* (2013.01); *G02B 26/125* (2013.01); *G03G 15/0409* (2013.01)

(58) Field of Classification Search
CPC ............................ G03G 15/041; G02B 26/121
USPC ......... 399/4, 177, 206, 220, 221; 359/212.2; 250/236
See application file for complete search history.

(56) References Cited

U.S. PATENT DOCUMENTS

| 4,842,354 A * | 6/1989 | Takahashi ................ G02B 5/09 359/218.1 |
| 6,856,338 B2 | 2/2005 | Takahashi et al. ........... 347/225 |
| 6,969,846 B2 | 11/2005 | Tanaka et al. ................ 250/239 |
| 9,128,291 B2 | 9/2015 | Nagatoshi et al. .. G02B 26/121 |
| 2012/0141167 A1* | 6/2012 | Chun ....................... G02B 5/09 399/151 |
| 2015/0338768 A1 | 11/2015 | Nagatoshi et al. .. G02B 26/129 |

FOREIGN PATENT DOCUMENTS

| JP | 2002-228964 | 8/2002 |
| JP | 2003-057584 | 2/2003 |
| JP | 2003-279878 | 10/2003 |
| JP | 2006-058723 | 3/2006 |
| JP | 2010-002751 | 1/2010 |

* cited by examiner

*Primary Examiner* — Hoan Tran
(74) *Attorney, Agent, or Firm* — Fitzpatrick, Cella, Harper & Scinto (57) ABSTRACT

The light deflection unit including a rotary member having a rotor frame formed of a plate of a metal, and a rotary polygon mirror configured to rotate together with the rotor frame and deflect a light beam emitted from a light source, in which a mass of the rotor frame is largest among masses of a plurality of members forming the rotary member, the mass of the rotor frame is smaller than 3 g, and a thickness of the plate of metal is set within a range in which a stress amplitude of a portion of the rotor frame on which a largest stress is exerted during rotation of the rotor member becomes smaller than a fatigue limit of the metal.

8 Claims, 4 Drawing Sheets

LIGHT DEFLECTION UNIT, OPTICAL SCANNING APPARATUS, AND IMAGE FORMING APPARATUS

BACKGROUND OF THE INVENTION

Field of the Invention

The present invention relates to a light deflection unit including a rotary member having a rotor frame, an optical scanning apparatus, and an image forming apparatus.

Description of the Related Art

In general, an optical scanning apparatus to be used for an image forming apparatus such as a laser printer optically modulates a laser beam emitted from a light source in accordance with an image signal, and deflects and scans the optically-modulated laser beam with a light deflection unit including a rotary polygon mirror. The deflected and scanned laser beam is optically scanned by a scanning lens such as an optical imaging system having an fθ characteristic under a state of forming an image in a spot-like manner on an image bearing member such as a photosensitive drum, to thereby form an image.

In order to reduce dynamic imbalance of the rotary member, which is caused by rotation, a weight for balance correction is provided to a rotor frame or the rotary polygon mirror of the light deflection unit. When initial imbalance (state before the balance correction) is large, the amount of addition of the balance weight increases to increase a height of the balance weight in some cases. When the rotary member provided with the balance weight as described above rotates, air strikes on the balance weight to generate fluid dynamic noise. In Japanese Patent Application Laid-Open No. 2006-058723, the problem of generation of the fluid dynamic noise is reduced by defining the height of the balance weight.

In the related-art example described above, however, the balance weights are provided to a plurality of portions in some cases. Therefore, the related-art example has the following problem. Specifically, the fluid dynamic noise generated by the balance weight is noise having a frequency one to three times as high as a motor rotation period (noise having a frequency twice as high as the motor rotation period is particularly noticeable). In recent years, the fluid dynamic noise generated in the light deflection unit that is rotationally driven at a high speed becomes extremely annoying. The fluid dynamic noise is generated for each balance weight. Therefore, when the balance weights are provided to a plurality of portions, the fluid dynamic noise is generated at each of the plurality of portions where the balance weights are respectively provided. For example, in a case where the balance weights are excessively added in a first balance correction and the amount of imbalance of the rotary member of the light deflection unit fails to fall within a defined amount, a second balance correction is implemented. In this case, a position where the second balance correction is implemented is in an opposite phase to that of the position of the first balance correction (is a position rotated at 180°). If the rotary member of the light deflection unit rotates under this state, the fluid dynamic noise is generated at the two positions where the balance weights are respectively provided. As a result, the fluid dynamic noise becomes larger than that in the case where the balance weight is provided to one position.

SUMMARY OF THE INVENTION

An object of the present invention is to provide a light deflection unit, an optical scanning apparatus, and an image forming apparatus capable of suppressing fatigue fracture of a rotor frame while reducing a frequency of addition of balance weights as much as possible.

Another object of the present invention is to provide a light deflection unit comprising a rotary member, wherein the rotary member includes a rotor frame formed of a plate of a metal, and a rotary polygon mirror configured to rotate together with the rotor frame and deflect a light beam emitted from a light source, wherein a mass of the rotor frame is largest among masses of a plurality of members forming the rotary member, wherein the mass of the rotor frame is smaller than 3 g, and wherein a thickness of the plate is set within a range in which a stress amplitude of a portion of the rotor frame on which a largest stress is exerted during rotation of the rotor member is smaller than a fatigue limit of the metal.

A further object of the present invention is to provide an optical scanning apparatus including a light source, and a light deflection unit including a rotary member, wherein the rotary member comprises a rotor frame formed of a plate of a metal, and a rotary polygon mirror configured to rotate together with the rotor frame and deflect a light beam emitted from a light source, wherein a mass of the rotor frame is largest among masses of a plurality of members forming the rotary member, wherein the mass of the rotor frame is smaller than 3 g, and wherein a thickness of the plate is set within a range in which a stress amplitude of a portion of the rotor frame on which a largest stress is exerted during rotation of the rotor member is smaller than a fatigue limit of the metal.

A still further object of the present invention is to provide an optical scanning apparatus including a light source, and a light deflection unit including a rotary member, wherein the rotary member comprises a rotor frame formed of a plate of a metal, and a rotary polygon mirror configured to rotate together with the rotor frame and deflect a light beam emitted from a light source, wherein a mass of the rotor frame is largest among masses of a plurality of members forming the rotary member, wherein the mass of the rotor frame is smaller than 3 g, and wherein a thickness of the plate is set within a range in which a stress amplitude of a portion of the rotor frame on which a largest stress is exerted during rotation of the rotor member is smaller than a fatigue limit of the metal.

Further features of the present invention will become apparent from the following description of exemplary embodiments with reference to the attached drawings.

DESCRIPTION OF THE EMBODIMENTS

Now, a mode for carrying out the present invention is exemplarily described in detail based on an embodiment referring to the accompanying drawings. Sizes, materials, shapes, and relative arrangements of components described in the embodiment do not intend to limit the scope of the present invention only thereto unless a specific description is particularly given thereof.

(Embodiment)

Referring to FIG. 1 to FIG. 5, a light deflection unit, an optical scanning apparatus, and an image forming apparatus according to an embodiment of the present invention are described. Examples of the image forming apparatus to which the present invention is applicable include a laser printer, a copying machine, and a facsimile machine. In this embodiment, the laser printer is described as an example.

<Image Forming Apparatus>

Figure 5:
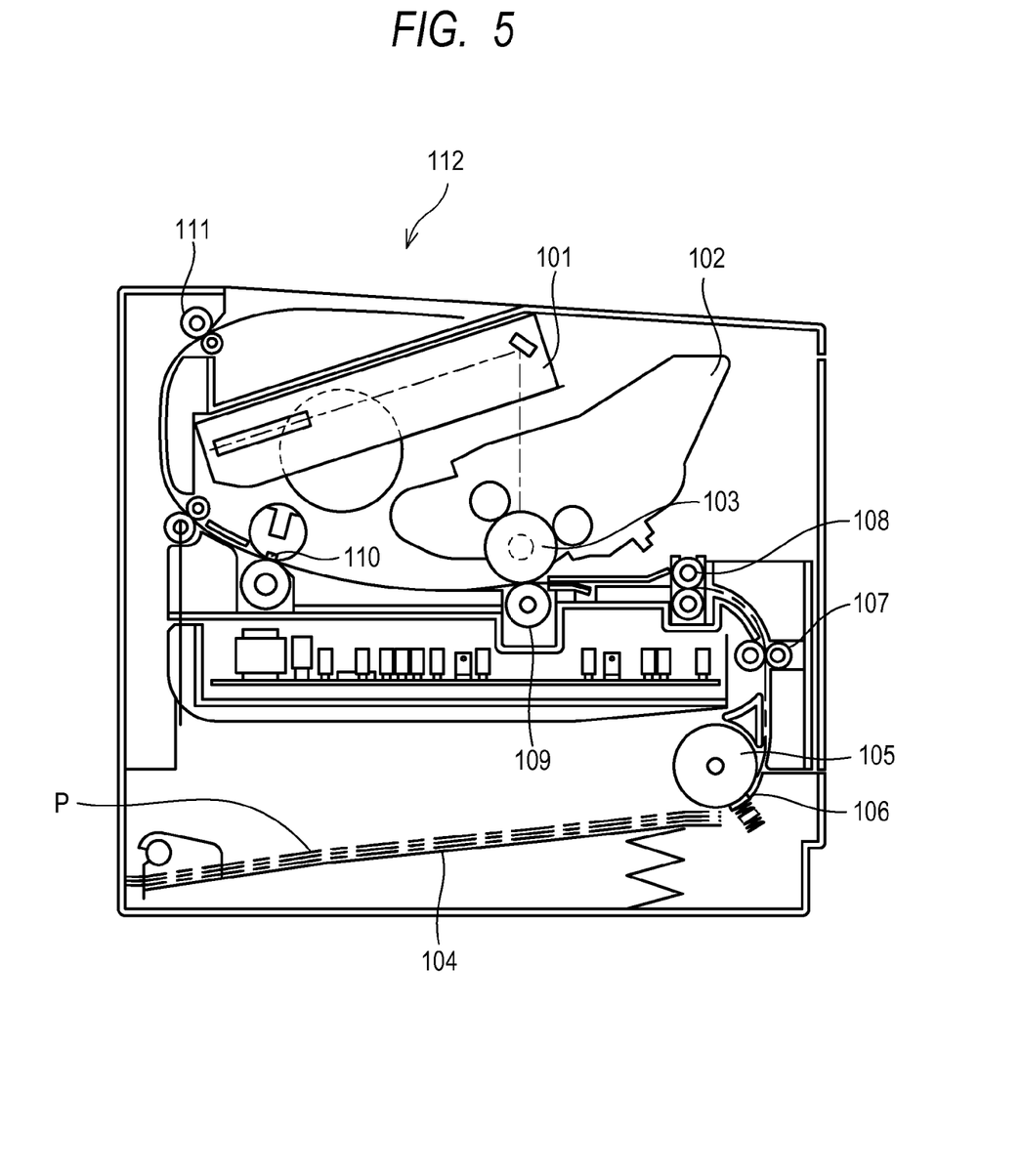
FIG. 5 is a schematic sectional view of an image forming apparatus according to the embodiment.

An image forming apparatus according to this embodiment is described referring to FIG. 5. FIG. 5 is a schematic sectional view of the image forming apparatus according to this embodiment, for illustrating a schematic configuration of the image forming apparatus in section. An image forming apparatus 112 according to this embodiment includes an optical scanning apparatus 101. The image forming apparatus 112 further includes an image forming unit. The image forming unit scans a photosensitive drum 103 serving as an image bearing member with the scanning optical apparatus 101, and forms an image on a recording material (sheet material such as paper) based on the scanned image. Now, the image forming apparatus 112 is more specifically described.

In the image forming apparatus 112, a laser beam based on obtained image information is emitted by the optical scanning apparatus 101 to be radiated on the photosensitive drum 103 that is built in a process cartridge 102. Then, a latent image is formed on the photosensitive drum 103. The thus formed latent image is visualized by the process cartridge 102 as a toner image with a toner serving as a developer. The process cartridge 102 includes the photosensitive drum 103, and a charge unit and a developing unit provided in an integrated manner as a processing unit configured to act on the photosensitive drum 103.

On the other hand, recording materials P stacked on a recording-material stacking plate 104 are fed by a feeding roller 105 while being separated one by one by a separating pad 106. The thus separated recording material P is further conveyed to a downstream side by intermediate rollers 107 and conveying rollers 108. Onto the conveyed recording material P, the toner image formed on the photosensitive drum 103 is transferred by a transfer roller 109. The recording material P on which the unfixed toner image is formed is further conveyed to the downstream side. The toner image is fixed onto the recording material P by a fixing device 110 including a heating member therein. Thereafter, the recording material P is discharged out of the image forming apparatus 112 by discharging rollers 111.

In this embodiment, a case where the charge unit and the developing unit serving as the processing unit configured to act on the photosensitive drum 103 are included integrally with the photosensitive drum 103 in the process cartridge 102 has been described. However, the present invention is also applicable to an image forming apparatus in which each of the charge unit and the developing unit included in the processing unit is formed independently of the photosensitive drum 103.

<Optical Scanning Apparatus>

Figure 4:
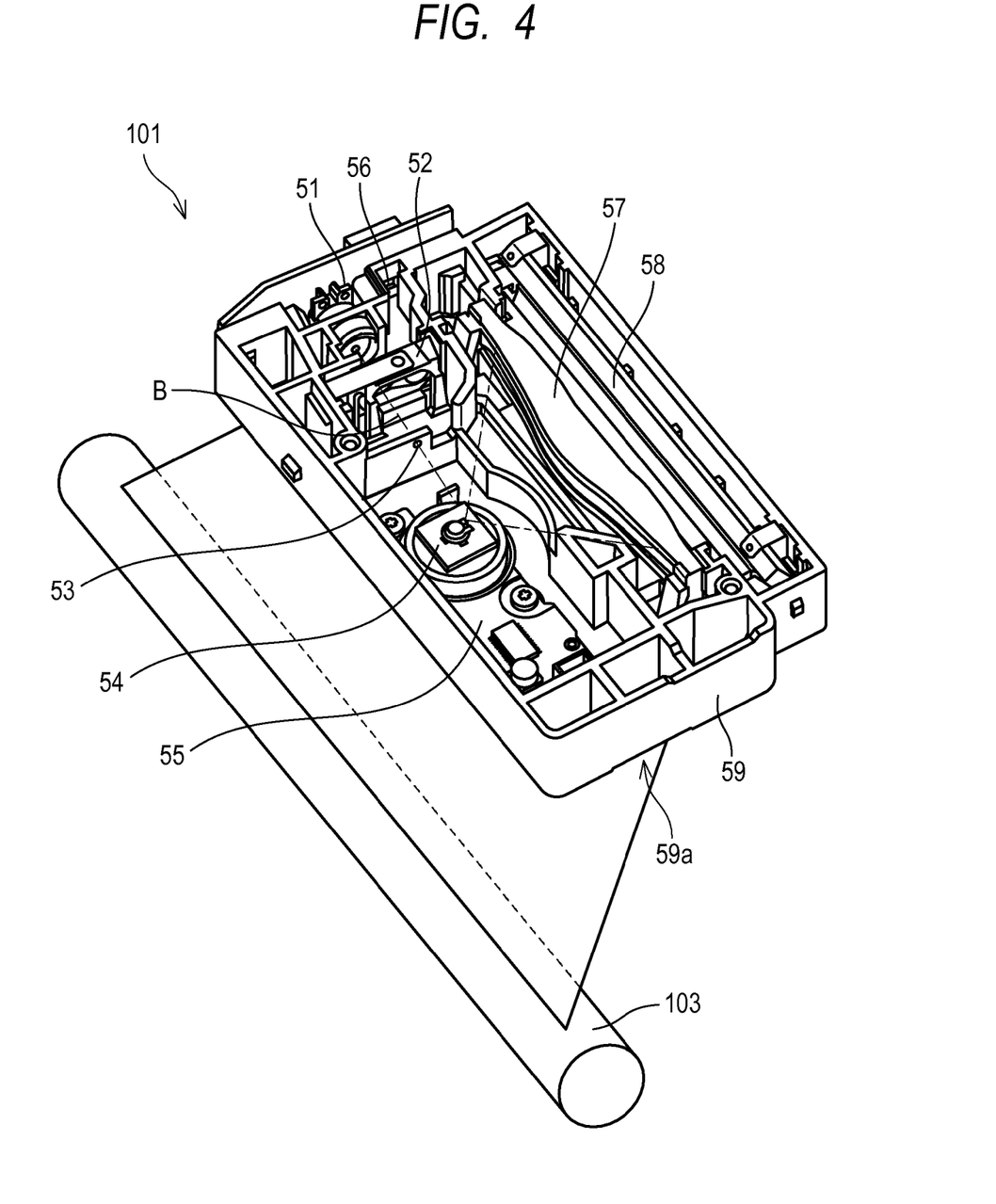
FIG. 4 is a perspective view of an optical scanning apparatus according to the embodiment.

Next, the optical scanning apparatus 101 according to this embodiment is described further in detail referring particularly to FIG. 4. FIG. 4 is a perspective view of the optical scanning apparatus according to this embodiment. The optical scanning device 101 includes a semiconductor laser unit 51, a compound anamorphic collimator lens 52, and a light deflection unit 55. The semiconductor laser unit 51 serves as a light source configured to emit a laser beam B. The compound anamorphic collimator lens 52 includes a plurality of optical components in an integrated manner. The light deflection unit 55 deflects the laser beam B. The compound anamorphic collimator lens 52 includes an anamorphic collimator lens and a signal detection lens (or a BD lens) that are formed integrally. The anamorphic collimator lens is a combination of a collimator lens and a cylindrical lens that are integrated with each other.

In the configuration described above, the laser beam B emitted from the semiconductor laser unit 51 is converted by the compound anamorphic collimator lens 52 into approximately parallel light or convergent light in a main scanning direction and into convergent light in a sub-scanning direction. Next, the laser beam B passes through an aperture stop 53 to have a limited beam width and then forms an image on a reflecting surface of a rotary polygon mirror 54 in a focal line shape extending in an elongated fashion in the main scanning direction. Then, the laser beam B is deflected and scanned by the rotating rotary polygon mirror 54, and then enters the BD lens of the compound anamorphic collimator lens 52. After passing through the BD lens, the laser beam B enters a signal detection sensor 56. At this time, a signal is detected by the signal detection sensor 56. A timing at which the signal is detected is set as a synchronization detection timing for a writing start position in the main scanning direction. Next, the laser beam B enters an fθ lens 57 serving as a scanning lens. The fθ lens 57 is designed to focus the laser beam so as to form a spot on a surface of the photosensitive drum 53 (on a surface to be scanned) and to keep a scanning speed of the spot constant. In order to obtain the above-mentioned characteristics of the fθ lens 57, the fθ lens 57 is formed of an aspheric lens. After passing through the fθ lens 57, the laser beam B is reflected by a reflection mirror 58 to outgo from a light emitting window 59a of an optical box 59 to form an image and scanned on the surface of the photosensitive drum 53 (on the surface to be scanned).

As described above, the laser beam is deflected and scanned by the rotation of the rotary polygon mirror 54. The main scanning with the laser beam is performed over the photosensitive drum 103. Further, by rotationally driving the photosensitive drum 103 about an axis line of a cylinder of the photosensitive drum 103, sub-scanning is performed. In this manner, an electrostatic latent image is formed on the surface of the photosensitive drum 103 (on the surface to be scanned).

<Light Deflection Unit>

Figure 1:
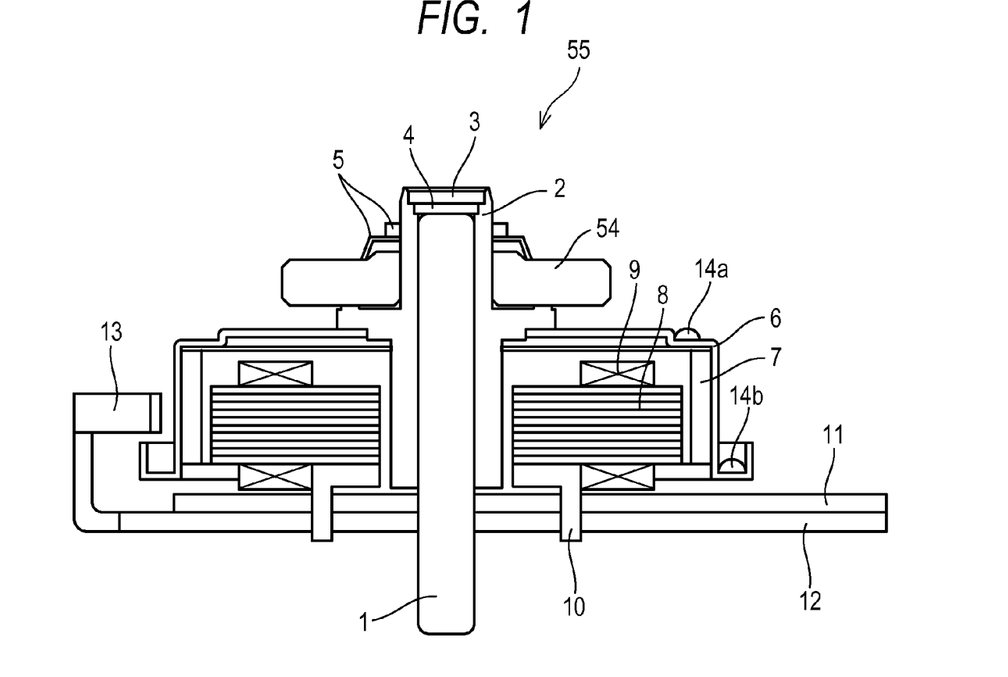
FIG. 1 is a schematic sectional view of a light deflection unit according to an embodiment of the present invention.

Next, the light deflection unit 55 included in the optical scanning apparatus is described referring to FIG. 1. FIG. 1 is a schematic sectional view of the light deflection unit 55, taken along a cross section containing a rotation center axis of the rotary member. The light deflection unit 55 includes a fixed shaft 1 and the rotary member. The fixed shaft 1 is fixed to an iron plate 12 by welding. The rotary member rotates relative to the fixed shaft 1. The rotary member includes a sleeve 2, the rotary polygon mirror 54, a rotor frame 6, and a rotor magnet 7. The sleeve 2 serves as a bearing for the fixed shaft 1. The rotary polygon mirror 54 is fixed to the sleeve 2. The rotor frame 6 is fixed to the sleeve 2. The rotor magnet 7 is fixed to an inner circumferential surface of the rotor frame 6. A thrust plate 4 and a thrust cover 3 are fixed to an upper end side of the sleeve 2. The rotary polygon mirror 54 is fixed to the sleeve 2 by a fixture 5. The rotor frame 6 is fixed to the sleeve 2 by fitting or caulking. The rotor frame 6 is made of a metal plate (a steel plate is given as a preferred example). Further, the rotor magnet 7 is fixed to the inner circumferential surface of the rotor frame 6 by bonding.

A stator core 8 and a stator coil 9 are provided on the iron plate 12. The stator core 8 is covered with an insulator 10. The stator coil 9 is wound around the stator core 8. The stator core 8 is fixed to a circuit substrate 11 provided on the iron plate 12 under a state of being electrically connected to the circuit substrate 11. Further, a stopper 13 for restricting movement of the rotor frame 6 fixed to the sleeve 2 in an axial direction of the rotary member is provided to the iron plate 12. The stopper 13 is provided so as to prevent the sleeve 2 from coming off of the fixed shaft 1 when vibration or a shock is applied to the light deflection unit 55.

In the light deflection unit 55 configured as described above, when a current is supplied to the stator coil 9, an electromagnetic force is generated between the stator coil 9 and the rotor magnet 7. As a result, the rotary member rotates about a center axial line of the sleeve 2 supported over the fixed shaft 1. Among the components described above, the sleeve 2, the rotary polygon mirror 54, the rotor frame 6, the rotor magnet 7, the thrust plate 4, the thrust cover 3, and the fixture 5 are components of the rotary member.

<Correction of Dynamic Balance>

A dynamic balance correction for the rotary member is described. Initial imbalance exists in the rotary member under a state in which the above-mentioned components are assembled. Specifically, a center of gravity of the rotary member is out of alignment with a center of rotation due to a variation in a joint state between the members and a variation in size of each of the members. If the rotary member with mass imbalance as described above is rotated, dynamic imbalance occurs. When the dynamic imbalance occurs, vibration or noise is generated due to whirling of the rotary member, resulting in a fear of degradation of image quality in the image forming apparatus and increase in noise. In view of the problem described above, balance weights 14a and 14b are provided to a part of (two portions, that is, an upper portion and a lower portion in this embodiment) of the rotor frame 6 included in the rotary member to correct the dynamic balance (see FIG. 1). Through the provision of the balance weights 14a and 14b, the mass imbalance of the rotary member is reduced. In this embodiment, an independent balance correction is implemented at each of the two positions. Therefore, the balance weights 14a and 14b are provided to the two portions in a single balance correction.

The balance weights 14a and 14b are made of a mixture of a photocurable adhesive such as a UV-curable adhesive with metal particles or glass beads. After an appropriate amount of the adhesive mixture is applied to two proper portions of the rotor frame 6, light such as an ultraviolet ray is radiated to cure the adhesive mixture. As a result, the balance weights 14a and 14b are formed and bonded to the rotor frame 6. Further, if a specific gravity of the balance weights 14a and 14b is small, the amount of application of the adhesive mixture is required to be increased. Therefore, a variation in the amount of application of the adhesive mixture or misalignment of a position of application is likely to occur. In addition, a longer curing time is required. On the other hand, if the specific gravity of the balance weights 14a and 14b is too large, a variation in the amount of application of the adhesive mixture at each application increases. Therefore, in general, the balance weights having the specific gravity of about 1 to 3 are used.

The number of the balance corrections (the frequency of application of the adhesive mixture to form the balance weights) depends on an initial imbalance amount of the rotary member. When the initial imbalance amount is large, the amount of adhesive mixture to be applied to form the balance weights is required to be increased. Therefore, a variation in the amount of application of the adhesive mixture or misalignment of the position of application is likely to occur. Thus, the initial imbalance amount cannot be corrected to be a defined imbalance amount or smaller by a single balance correction in some cases, and hence a plurality of balance corrections are sometimes implemented.

As described above, a larger number of balance corrections, specifically, a higher frequency of application of the adhesive mixture to form the balance weights undesirably increases the noise. Therefore, for the light deflection unit 55 according to this embodiment, a configuration that allows the number of balance corrections (the frequency of application of the adhesive mixture to form the balance weights) to be reduced as much as possible is adopted. More specifically, the configuration of the light deflection unit 55 is contrived so that only a single balance correction is sufficient. Now, the configuration of the light deflection unit 55 is described in detail.

The initial imbalance amount of the rotary member is expressed by a product of a mass of the rotary member and a distance from a center of rotation of the rotary member to the center of gravity of the rotary member. Therefore, in order to reduce the initial imbalance amount of the rotary member, the mass of the rotary member only needs to be reduced. The rotary member is generally configured so that the rotor frame 6 has the largest mass among the plurality of members forming the rotary member. For example, when the sleeve 2 is made of brass, the rotary polygon mirror 54 is made of aluminum, the rotor frame 6 is made of a steel plate, and the rotor magnet 7 is made of a ferrite-based rubber magnet, the mass of the rotor frame 6 is about half or larger of the total mass of the rotary member. That is, the reduction of the mass of the rotor frame 6 leads to effective reduction of the initial imbalance amount of the rotary member. Therefore, for the light deflection unit 55 according to this embodiment, the configuration that enables the reduction of the mass of the rotor frame 6 is adopted. Now, the configuration for reducing the mass of the rotor frame 6 is described in detail.

<Mass of Rotor Frame>

Figure 2:
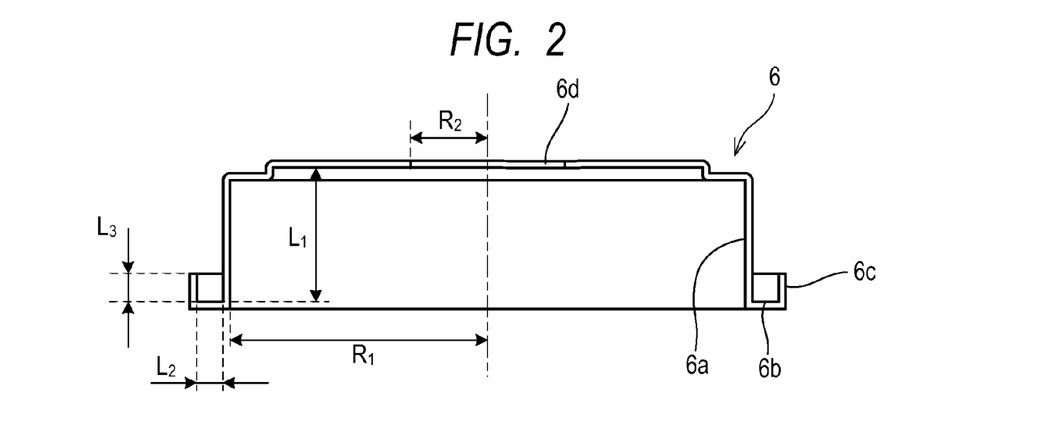
FIG. 2 is a schematic sectional view of a rotor frame according to the embodiment.

FIG. 2 is a schematic sectional view of the rotor frame 6 according to this embodiment, taken along a cross section containing the rotation center axis of the rotary member. The rotor frame 6 includes a rotor-magnet holding portion 6a serving as a frame main body portion having a cylindrical shape and an inward-looking flange portion 6d. The inward-looking flange portion 6d extends radially inward from one end of the rotor-magnet holding portion 6a. The sleeve 2 is fixed into a through hole formed in a distal end surface of the inward-looking flange portion 6d by fitting or caulking. In addition, the rotor frame 6 further includes an outward-looking flange portion 6b and a bent-back portion 6c having a cylindrical shape. The outward-looking flange portion 6b extends radially outward from another end of the rotor-magnet holding portion 6a. The bent-back portion 6c extends from a distal end of the outward-looking flange portion 6b toward the one end side of the rotor-magnet holding portion 6a.

Now, a plate thickness of the steel plate that forms the rotor frame 6 is represented by t [mm], an inner diameter of the rotor-magnet holding portion 6a having the cylindrical shape is represented by $2R_1$ [mm], and an inner diameter of a cylindrical surface formed at the distal end of the inward-looking flange portion 6d is represented by $2R_2$ [mm]. Further, a distance from the inward-looking flange portion 6d to the outward-looking flange portion 6b in the axial direction of the rotary member is represented by $L_1$ [mm], a length of the outward-looking flange portion 6b in a radial direction of the rotary member is represented by $L_2$ [mm], a length of the bent-back portion 6c in the axial direction of the rotary member is represented by $L_3$ [mm], and a specific gravity of the rotor frame 6 is represented by $\rho_1$ [g/mm$^3$]. Then, a mass m [g] of the rotor frame 6 is expressed by (Expression 1).

$$m=\pi\times\{2R_1L_1+2(R_1+L_2)L_3+(R_1+L_2)^2-R_2^2\}\times t\times\rho_1 \quad \text{(Expression 1)}$$

For example, when $R_1$=11.4 [mm], $R_2$=3.5 [mm], $L_1$=6.1 [mm], $L_2$=1.2 [mm], $L_3$=1.6 [mm], t=0.5 [mm], and $\rho_1$=7.85×10$^{-3}$ [g/mm$^3$], m=3.8 [g] is obtained. As a result of examination by the inventors of this application, when the mass m of the rotor frame 6 was 3.8 [g], the imbalance amount was reduced to the defined amount or smaller by the single balance correction at about 90% to 95%. When the mass m of the rotor frame 6 was set to 3 [g] or smaller, the imbalance amount was successfully reduced to the defined amount or smaller by the single balance correction at approximately 100%. Therefore, as expressed by (Expression 2), by setting the mass m of the rotor frame 6 smaller than 3 [g], the single balance correction is sufficient to eliminate the dynamic imbalance.

$$3>\pi\times\{2R_1L_1+2(R_1+L_2)L_3+(R_1+L_2)^2-R_2^2\}\times t\times\rho_1 \quad \text{(Expression 2)}$$

Then, when (Expression 2) is converted into an expression of the thickness t of the rotor frame 6, (Expression 3) is obtained.

$$t<\frac{3}{\pi\times\{2R_1L_1+2(R_1+L_2)L_3+(R_1+L_2)^2-R_2^2\}\times\rho_1} \quad \text{(Expression 3)}$$

The thickness t of the steel plate that forms the rotor frame 6 is set to satisfy (Expression 3) determined by an outer size and the specific gravity of the rotor frame 6. Through this setting, the initial imbalance amount of the rotary member is reduced so that the elimination of the dynamic imbalance can be completed by the single balance correction at approximately 100%. However, if the plate thickness t of the steel plate is set too small for the purpose of reducing the mass of the rotor frame 6, there is a fear in that the rotor frame 6 is broken due to fatigue fracture. Regarding the problem, a lower limit of the plate thickness t of the steel plate is now described.

<Lower Limit of Plate Thickness of Steel Plate that Forms Rotor Frame>

The lower limit of the plate thickness t of the steel plate that forms the rotor frame 6 is described. When the light deflection unit 55 is repeatedly rotated, a cyclic stress due to a centrifugal force is exerted on the rotor frame 6. Therefore, the plate thickness t of the steel plate cannot be set extremely small. In general, if a stress amplitude exceeding a fatigue limit is cyclically applied, fatigue fracture occurs in a material. It is known that the fatigue limit in this case is generally highly correlated with a tensile strength. Specifically, the fatigue limit is 0.35 to 0.64 time as large as the tensile strength in a case where a load mode is rotating bending, is 0.33 to 0.59 time as large as the tensile strength in a case where the load mode is completely reversed tension and compression, and is 0.22 to 0.37 time as large as the tensile strength in a case where the load mode is torsion.

In the case of the rotor frame 6 according to this embodiment, the stress at the fatigue limit is desired to be set to 0.22 time as large as the tensile strength in terms of safety so that the fatigue fracture is least likely to be caused although the load mode is the torsion for a short period of time. A maximum value of the stress on the rotor frame 6 during the rotation of the light deflection unit 55 is represented by $\sigma_{max}$ [N/mm$^2$]. Then, the stress amplitude $\sigma_a$ [N/mm$^2$] is expressed as: $\sigma_a=\sigma_{max}/2$. In general, the stress amplitude $\sigma_a$ [N/mm$^2$] is expressed as: $\sigma_a=(\sigma_{max}-\sigma_{min})/2$. In the case of the light deflection unit 55 according to this embodiment, however, the light deflection unit 55 operates in a mode in which the rotation and the stop are repeated. When the light deflection unit 55 is in a stopped state, the stress is zero, and therefore $\sigma_{min}$=0. In order to prevent the fatigue fracture, the stress amplitude $\sigma_a$ only needs to be reduced to be smaller than the fatigue limit. Therefore, when the tensile strength of the rotor frame 6 is represented by $\sigma$ [N/mm$^2$], the maximum value $\sigma_{max}$ of the stress is expressed as the following expression.

$$\frac{\sigma_{max}}{2}<0.22\times\sigma$$

That is, the following expression is obtained.

$$\sigma_{max}<0.44\times\sigma \quad \text{(Expression 4)}$$

A portion of the rotor frame 6 on which the largest stress is exerted during the rotation of the rotary member is the rotor-magnet holding portion 6a. The stress exerted on the rotor-magnet holding portion 6a is expressed as a resultant force of a stress $\sigma_1$ exerted on the rotor frame 6 due to the centrifugal force and a stress $\sigma_2$ generated by a force received from the rotor magnet 7.

From the above-mentioned facts, the maximum value $\sigma_{max}$ of the stress is expressed by the following expression.

$$\sigma_{max}=\sigma_1+\sigma_2 \quad \text{(Expression 5)}$$

A relational expression of the stresses $\sigma 1$ and $\sigma 2$ in (Expression 5) is calculated for a shape of the rotor frame 6 of this embodiment by using a numerical analysis simulation. Now, the calculation is described more specifically. A number of revolution of the rotary member of the light deflection unit 55 is represented by N [min$^{-1}$], a thickness of the rotor magnet 7 is represented by $t_m$, and a specific gravity of the rotor magnet 7 is represented by $\rho_2$. Then, each of the parameters (N, $R_1$, $t_m$, $\rho_1$, and $\rho_2$) of the rotary member is changed in a simulation to calculate the stresses $\sigma_1$ and $\sigma_2$ for each change. FIG. 3A to FIG. 3F are graphs for showing the results of numerical analysis simulation. FIG. 3A to FIG. 3F are graphs for showing a relationship between each of the parameters and the stresses $\sigma_1$ and $\sigma_2$ in the rotary member.

In each of the graphs, parameters that are not indicated on the horizontal axes are set to the following values. Specifically, the number of revolution N is set to 45,000 [min$^{-1}$], the specific gravity $\rho_1$ of the rotor frame 6 is set to 7.85×10$^{-3}$ [g/mm$^3$], the plate thickness t of the steel plate that forms the rotor frame 6 is set to 0.5 [mm], and an inner diameter $2R_1$ of the rotor-magnet holding portion 6a is set to 22.8 [mm]. A half of the inner diameter $2R_1$ of the rotor-magnet holding portion 6a is hereinafter referred to as "radius $R_1$ of the rotor frame 6" as needed. Therefore, the radius $R_1$ of the rotor frame 6 is 11.4 [mm]. The specific gravity $\rho_2$ of the rotor magnet is 3.7×10$^{-3}$ [g/mm$^3$], and the thickness $t_m$ of the rotor magnet 7 is 0.9 [mm].

Figure 3A:
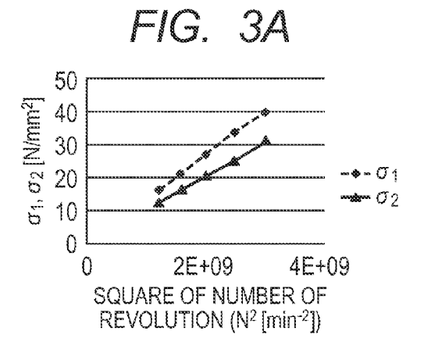
FIGS. 3A, 3B, 3C, 3D, 3E and 3F are graphs relating to a stress exerted on the rotor frame according to the embodiment.
Figure 3B:
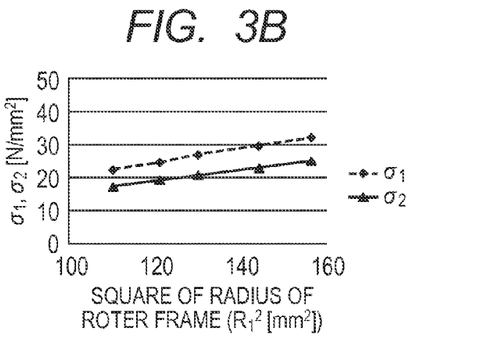
Figure 3C:
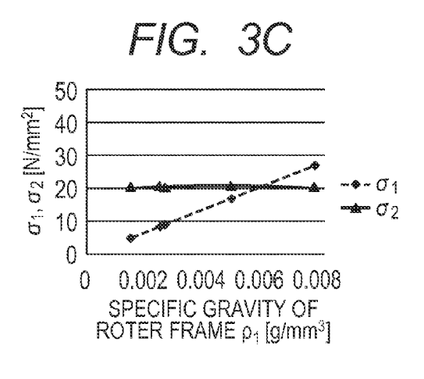
Figure 3D:
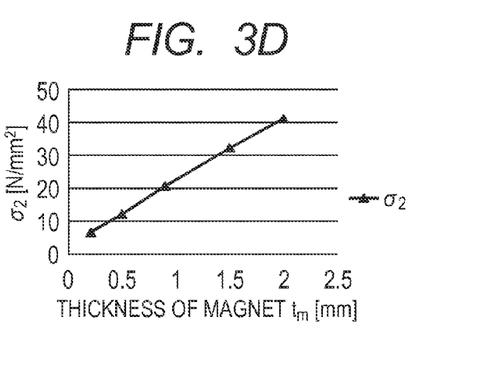
Figure 3E:
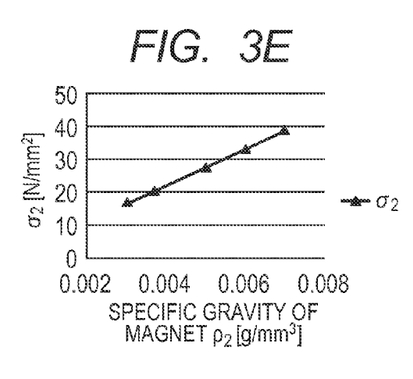
Figure 3F:
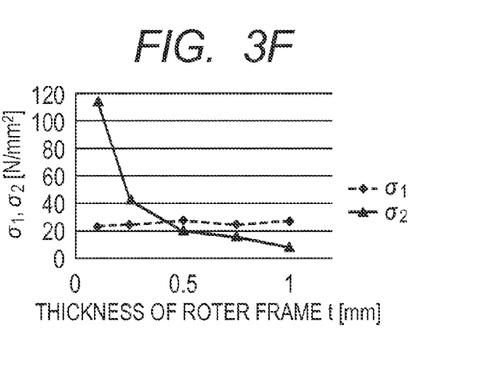

The results of numerical analysis simulation show that the stress $\sigma_1$ is proportional to each of a square of the number of revolution N (see FIG. 3A), a square of the radius $R_1$ of the rotor frame 6 (see FIG. 3B), and the specific gravity $\rho_1$ of the rotor frame 6 (see FIG. 3C). The results of numerical analysis simulation also show that the stress $\sigma_2$ is proportional to each of the square of the number of revolution N (see FIG. 3A), the square of the radius $R_1$ of the rotor frame 6 (see FIG. 3B), the thickness $t_m$ of the rotor magnet 7 (see FIG. 3D), and the specific gravity $\rho_2$ of the rotor magnet 7 (see FIG. 3E). Further, the results of numerical analysis simulation show that the stress $\sigma_2$ is inversely proportional to the thickness of the rotor frame 6 (the thickness t of the steel plate that forms the rotor frame 6) (see FIG. 3F). From the above-mentioned results, the stresses $\sigma_1$ and $\sigma_2$ can be expressed using constants A and B as (Expression 6) and (Expression 7), respectively.

$$\sigma_1 = A \times \rho_1 \times (R_1 \times N)^2 \quad \text{(Expression 6)}$$

$$\sigma_2 = B \times \frac{\rho_2 \times t_m \times (R_1 \times N)^2}{t} \quad \text{(Expression 7)}$$

Values of the constants A and B are analyzed from the results shown in FIG. 3A to FIG. 3F. Then, $A=1.28\times10^{-8}$ and $B=1.19\times10^{-8}$ are obtained. By assigning the thus obtained values of the constants A and B to (Expression 6) and (Expression 7), (Expression 8) and (Expression 9) are obtained. More specifically, the constants A and B are calculated by performing a simulation for various combinations of the parameters in (Expression 6) and (Expression 7), and obtaining an average value of the thus obtained values of the constant A and an average value of the thus obtained values of the constant B.

$$\sigma_1 = 1,28 \times 10^{-8} \times \rho_1 \times (R_1 \times N)^2 \quad \text{(Expression 8)}$$

$$\sigma_2 = 1.19 \times 10^{-8} \times \frac{\rho_2 \times t_m \times (R_1 \times N)^2}{t} \quad \text{(Expression 9)}$$

From (Expression 5), (Expression 8), and (Expression 9), (Expression 10) is obtained.

$$\sigma_{max} = 1.28 \times 10^{-8} \times \rho_1 \times (R_1 \times N)^2 + \\ 1.19 \times 10^{-8} \times \frac{\rho_2 \times t_m \times (R_1 \times N)^2}{t} \quad \text{(Expression 10)}$$

Therefore, from (Expression 4) and (Expression 10), an expression for preventing the fatigue fracture of the rotor frame 6 is obtained as (Expression 11).

$$1.28 \times 10^{-8} \times \rho_1 \times (R_1 \times N)^2 + \\ 1.19 \times 10^{-8} \times \frac{\rho_2 \times t_m \times (R_1 \times N)^2}{t} < 0.44 \times \sigma \quad \text{(Expression 11)}$$

Then, (Expression 11) that is converted into an expression of the plate thickness t of the steel plate that forms the rotor frame 6 is expressed as (Expression 12).

$$t > \frac{1.19 \times 10^{-8} \times \rho_2 \times t_m \times (R_1 \times N)^2}{0.44 \times \sigma - 1.28 \times 10^{-8} \times \rho_1 \times (R_1 \times N)^2} \quad \text{(Expression 12)}$$

From (Expression 3) and (Expression 12) described above, the plate thickness t of the steel plate that forms the rotor frame 6 can be expressed by (Expression 13).

$$\frac{1.19 \times 10^{-8} \times \rho_2 \times t_m \times (R_1 \times N)^2}{0.44 \times \sigma - 1.28 \times 10^{-8} \times \rho_1 \times (R_1 \times N)^2} < \\ t < \frac{3}{\pi \times \{2R_1 L_1 + 2(R_1 + L_2)L_3 + (R_1 + L_2)^2 - r_2^2\} \times \rho_1} \quad \text{(Expression 13)}$$

From the above-mentioned calculations, when the plate thickness t of the steel plate that forms the rotor frame 6 is set so as to satisfy (Expression 13), the fatigue fracture is not caused in the rotor frame 6 and it is ensured that only a single balance correction is sufficient to correct the imbalance even if the light deflection unit 55 is repeatedly rotated.

In a case where the rotor frame 6 is formed of a steel plate and the rotor magnet 7 is a ferrite-based rubber magnet (flexible magnet), $\rho_1=7.85\times10^3$ [g/mm$^3$], $\rho_2=3.7\times10^{-3}$ [g/mm$^3$], and $\sigma=270$ [N/mm$^2$]. In this case, the plate thickness t of the steel plate that forms the rotor frame 6 only needs to be set so as to satisfy (Expression 14).

$$\frac{4.41 \times 10^{-11} \times t_m \times (R_1 \times N)^2}{119 - 1.01 \times 10^{-10} \times (R_1 \times N)^2} < t < \\ \frac{122}{2R_1 L_1 + 2(R_1 + L_2)L_3 + (R_1 + L_2)^2 - R_2^2} \quad \text{(Expression 14)}$$

For example, N=45,000 [min$^{-1}$], $R_1$=11.4 [mm], $L_1$=6.1 [mm], $L_2$=1.2 [mm], $L_3$=1.6 [mm], and $t_m$=0.9 [mm]. Then, in this case, from (Expression 14), the plate thickness t of the steel plate that forms the rotor frame 6 only needs to be set to 0.11 [mm] or larger and 0.39 [mm] or smaller.

In this embodiment, the case where the light deflection unit 55 is configured so that the rotary member rotates relative to the fixed shaft has been described. As the light deflection unit included in the optical scanning apparatus included in the image forming apparatus, however, there is also known a configuration in which the rotary member rotates together with a rotary shaft. Even in this case, the rotary member includes the rotary polygon mirror and the rotor frame. The present invention is also applicable to the rotor frame included in the thus configured light deflection unit.

<Advantages in Light Deflection Unit, Optical Scanning Apparatus, and Image Forming Apparatus According to this Embodiment>

As described above, in this embodiment, the lower limit value of the plate thickness t of the steel plate that forms the rotor frame 6 is set so that the stress amplitude exerted on the rotor frame 6 during the repeated rotation of the light deflection unit 55 becomes equal to or smaller than the fatigue limit of the rotor frame 6. Further, the upper limit value of the plate thickness t of the steel plate that forms the rotor frame 6 is set so that the mass m of the rotor frame 6 becomes equal to or smaller than 3 g that allows the mass to be the defined amount or smaller by the single balance correction at substantially 100%. As described above, the fatigue fracture of the rotor frame 6 can be suppressed even when the light deflection unit 55 is repeatedly rotated. In addition, the initial imbalance amount of the rotary member included in the light deflection unit 55 can be reduced. As a result, the amount of application of the adhesive mixture to form the balance weights for the balance correction can be reduced to increase accuracy of the amount of application of the adhesive mixture to form the balance weights. Specifically, the balance correction can be implemented precisely, and hence the frequency of application of the adhesive mixture to form the balance weights can be reduced. As described above, it is substantially ensured that single application (single application to two positions) is sufficient to eliminate the dynamic imbalance.

Therefore, fluid dynamic noise having an annoying frequency that is generated in the balance weight portions by the rotation of the rotary member can be reduced. Further, the rotary member is reduced in weight by reducing the mass of the rotor frame 6. Therefore, an inertia moment of the rotary member is reduced to enable time (rise time) for the number of revolution of the rotary member to reach a rated number of revolution to be shortened. For example, when the plate thickness t of the steel plate that forms the rotor frame 6 is set to 0.3 [mm], the inertia moment of the rotor frame 6 is reduced to about 60[%] and the inertia moment of the entire rotary member is reduced to about 70[%] as compared with a case where the plate thickness t is 0.5 [mm]. As a result, the rise time of the light deflection unit can be shortened to about 70[%]. Specifically, a time period from rise of the optical scanning apparatus 101 to a time at which exposure can be started can be shortened, which can in turn shorten first print out time (FPOT) of the image forming apparatus 112.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-229797, filed Nov. 12, 2014, which is hereby incorporated by reference herein in its entirety.

What is claimed is:

1. A light deflection unit comprising a rotary member, wherein the rotary member comprises:
    a rotor frame formed of a plate of a metal; and
    a rotary polygon mirror configured to rotate together with the rotor frame and deflect a light beam emitted from a light source,
    wherein a mass of the rotor frame is largest among masses of a plurality of members forming the rotary member,
    wherein the mass of the rotor frame is smaller than 3 [gram],
    wherein the rotor frame comprises a frame main body portion having a cylindrical shape, an inward-looking flange portion extending radially inward from one end of the frame main body portion, an outward-looking flange portion extending radially outward from another end of the frame main body portion, and a bent-back portion having a cylindrical shape and extending from a distal end of the outward-looking flange portion toward the one end side of the frame main body portion,
    wherein when the thickness of the plate of the metal is represented by t mm, an inner diameter of the frame main body portion is represented by $2R_1$[mm], an inner diameter of a cylindrical surface formed by a distal end of the inward-looking flange portion is represented by $2R_2$ [mm], a distance from the inward-looking flange portion to the outward-looking flange portion in an axial direction of the rotor frame is represented by $L_1$ [mm], a length of the outward-looking flange portion in a radial direction of the rotor frame is represented by $L_2$ [mm], a length of the bent-back portion in the axial direction of the rotor frame is represented by $L_3$ [mm], and a specific gravity of the rotor frame is represented by $\rho_1$ [g/mm$^3$], $$t < \frac{3}{\pi \times \{2R_1 L_1 + 2(R_1 + L_2)L_3 + (R_1 + L_2)^2 - R_2^2\} \times \rho_1}$$

is satisfied, and
    wherein the thickness t of the plate is set within a range in which a stress amplitude of a portion of the rotor frame on which a largest stress is exerted during rotation of the rotor member is smaller than a fatigue limit of the metal.

2. A light deflection unit according to claim 1, wherein the rotor frame holds a magnet, and the portion of the rotor frame on which the largest stress is exerted includes a magnet holding portion of the rotor frame.

3. A light deflection unit according to claim 1, wherein the fatigue limit is set to 0.22 time as large as a tensile strength of the rotor frame.

4. A light deflection unit according to claim 1,
    wherein an inner circumferential surface of the frame main body portion has a cylindrical magnet fixed thereto, and
    wherein when a thickness of the cylindrical magnet is $t_m$[mm], a specific gravity of the cylindrical magnet is represented by $\rho_2$ [g/mm$^3$], a tensile strength of the rotor frame is represented by a $\sigma$[N/mm$^2$], and a number of revolution of the rotary member is represented by N[min$^{-1}$], $$t > \frac{1.19 \times 10^{-8} \times \rho_2 \times t_m \times (R_1 \times N)^2}{0.44 \times \sigma - 1.28 \times 10^{-8} \times \rho_1 \times (R_1 \times N)^2}$$

is satisfied.

5. A light deflection unit according to claim 4, wherein the cylindrical magnet comprises a flexible magnet.

6. An optical scanning apparatus, comprising:
    a light source; and
    a light deflection unit according to claim 1, wherein the light deflection unit deflects and scan a light beam emitted from the light source; and
    a scanning lens configured to image the light beam scanned by the light deflection unit on a surface to be scanned.

7. An optical scanning apparatus according to claim 6, wherein the rotor frame holds a magnet, and the portion of the rotor frame on which the largest stress is exerted comprises a magnet holding portion of the rotor frame.

8. An image forming apparatus, comprising:
    an optical scanning apparatus according to claim 6; and
    an image forming unit configured to scan an image bearing member with the optical scanning apparatus to form an image on a recording material based on an image obtained by the scanning.

* * * * *